United States Patent
Kesselman et al.

(10) Patent No.: US 11,394,780 B2
(45) Date of Patent: *Jul. 19, 2022

(54) SYSTEM AND METHOD FOR FACILITATING DEDUPLICATION OF OPERATIONS TO BE PERFORMED

(71) Applicant: Google LLC, Mountain View, CA (US)

(72) Inventors: Alexander Kesselman, Sunnyvale, CA (US); Alexandre Drobychev, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/171,487

(22) Filed: Feb. 9, 2021

(65) Prior Publication Data

US 2021/0168208 A1    Jun. 3, 2021

Related U.S. Application Data

(63) Continuation of application No. 15/785,285, filed on Oct. 16, 2017, now Pat. No. 10,938,903, which is a
(Continued)

(51) Int. Cl.
*H04L 67/1097* (2022.01)
*H04L 67/1001* (2022.01)
*G06F 3/06* (2006.01)

(52) U.S. Cl.
CPC .......... *H04L 67/1097* (2013.01); *G06F 3/067* (2013.01); *G06F 3/0608* (2013.01); *G06F 3/0641* (2013.01); *H04L 67/1002* (2013.01)

(58) Field of Classification Search
CPC ............................ G06F 3/067; H04L 67/1002
See application file for complete search history.

(56) References Cited

U.S. PATENT DOCUMENTS 6,611,867 B1 * 8/2003 Bowman-Amuah ....................... H04L 41/5025
709/224
7,228,417 B2 * 6/2007 Roskind .............. H04L 63/0815
713/168
(Continued)

OTHER PUBLICATIONS

Austin, Grid Enabling Data De-duplication, e-science.pp. 2, Second IEEE International Conference on e-Science and Grid Computing (e-Science '06), 2006, 6pgs.
(Continued)

*Primary Examiner* — Philip J Chea
*Assistant Examiner* — Mohammed Ahmed
(74) *Attorney, Agent, or Firm* — Lerner, David, Littenberg, Krumholz & Mentlik, LLP

(57) ABSTRACT

A system, computer-readable storage medium storing at least one program, and a computer-implemented method for facilitating deduplication of operations to be performed is presented. An operation to be performed is received. A mapping function is applied to at least one parameter of the operation to produce a mapping value in a target mapping space, the target mapping space being partitioned between target servers in a set of target servers proportional to resource capacities of the target servers in the set of target servers. A target server in the set of target servers whose portion of the target mapping space includes the mapping value is identified. The operation is issued to the target server.

20 Claims, 8 Drawing Sheets

Related U.S. Application Data continuation of application No. 13/874,381, filed on Apr. 30, 2013, now Pat. No. 9,819,728.

(60) Provisional application No. 61/640,632, filed on Apr. 30, 2012.

(56) References Cited

U.S. PATENT DOCUMENTS

| | | | | |
|---|---|---|---|---|
| 8,233,431 B2* | 7/2012 | Pirskanen | H04L 1/1812 | 370/328 |
| 8,332,617 B2* | 12/2012 | Gelson | H04L 67/1095 | 711/216 |
| 8,515,904 B1* | 8/2013 | Dwyer, III | G06F 16/182 | 711/112 |
| 2003/0055933 A1 | 3/2003 | Ishizaki | | |
| 2004/0263862 A1* | 12/2004 | Amparan | G01B 11/0608 | 356/601 |
| 2005/0276174 A1* | 12/2005 | Jang | G11B 19/125 | |
| 2005/0278270 A1* | 12/2005 | Carr | G06Q 10/10 | 706/25 |
| 2006/0218360 A1 | 9/2006 | Burkey | | |
| 2008/0001791 A1 | 1/2008 | Wanigasekara-Mohotti | | |
| 2009/0222509 A1* | 9/2009 | King | H04L 67/1097 | 709/203 |
| 2010/0011368 A1* | 1/2010 | Arakawa | G06F 3/0665 | 711/170 |
| 2010/0106691 A1* | 4/2010 | Preslan | G06F 16/21 | 707/674 |
| 2010/0180262 A1* | 7/2010 | Aranguren | G06F 11/366 | 717/131 |
| 2012/0185447 A1* | 7/2012 | Zhang | G06F 16/278 | 707/693 |
| 2012/0197800 A1* | 8/2012 | Ross | G06Q 20/40 | 705/44 |
| 2012/0215560 A1* | 8/2012 | Ofek | G06Q 10/10 | 705/3 |
| 2013/0166589 A1* | 6/2013 | Baeumges | G06F 16/2455 | 707/769 |
| 2013/0166606 A1* | 6/2013 | Fricke | G06F 16/2282 | 707/E17.054 |
| 2013/0311445 A1* | 11/2013 | Narita | G06F 16/90344 | 707/714 |
| 2014/0137223 A1* | 5/2014 | Wagner | H04L 63/0815 | 726/7 |
| 2014/0169238 A1* | 6/2014 | Cai | H04L 1/1822 | 370/328 |
| 2016/0042005 A1* | 2/2016 | Liu | G06F 3/0643 | 711/103 |
| 2016/0043970 A1* | 2/2016 | Jacob | H04L 67/16 | 709/226 |
| 2019/0081722 A1* | 3/2019 | Takeda | H04B 1/713 | |

OTHER PUBLICATIONS

Marks, Analysis: Using Data De-duplication to Cut Storage Requirements, http://www.scaleoutadvantage.techweb.com/news/str.sub.-nwc20070406.sub.-- -analysis.jhtml, Mar. 19, 2007, 5 pgs.

Nath, Evaluating the Usefulness of Content Addressable Storage for High-performance Data Intensive Applications, HPDC Jun. 23-27, 2008, 10pgs.

* cited by examiner

SYSTEM AND METHOD FOR FACILITATING DEDUPLICATION OF OPERATIONS TO BE PERFORMED

RELATED APPLICATIONS

The present application is a continuation of U.S. patent application Ser. No. 15/875,285, filed Oct. 16, 2017, which is a continuation of U.S. patent application Ser. No. 13/874,381, filed Apr. 30, 2013, now U.S. Pat. No. 9,819,728, which claims priority to U.S. Provisional Application No. 61/640,632, filed Apr. 30, 2012, the disclosures of which are incorporated herein by reference.

TECHNICAL FIELD

The disclosed implementations relate generally to facilitating deduplication of operations to be performed.

BACKGROUND

In a distributed computing system, a plurality of servers are used to provide load balancing and/or provide low-latency points of access to nearby computer systems. For example, in a distributed storage system, data is replicated in storage clusters that are located across multiple geographical locations. In doing so, the availability of the data is increased and the network proximity of the data to client computer systems is decreased. When a large object, such as a video file, is uploaded to a storage cluster in a distributed storage system, other objects with identical content may already exist in the distributed storage system. Furthermore, if the object becomes popular, multiple instances of the object may be uploaded around the same time (e.g., via email attachments) to multiple storage clusters in the distributed storage system. To avoid unnecessarily duplicating use of resources in a distributed computing system, deduplication techniques may be used. For example, deduplication techniques may be used to ensure that only one replica of the content for a plurality of identical objects is stored in the same storage cluster and that the plurality of identical objects are not unnecessarily replicated to other storage clusters. However, deduplication techniques cannot be easily applied across the distributed computing system.

SUMMARY

According to some implementations, deduplication of operations is performed by a server having at least one processor and memory. The memory stores at least one program for execution by the at least one processor. The server receives an operation to be performed, and applies a mapping function to at least one parameter of the operation. The mapping function produces a mapping value in a target mapping space. The target mapping space is partitioned among a plurality of target servers, where the partition for each respective target server is proportional to the respective resource capacity of the respective target server. The server identifies a target server in the set of target servers whose portion of the target mapping space includes the mapping value, and issues the operation to the target server.

According to some implementations, prior to applying the mapping function to the at least one parameter of the operation, the server also: obtains the resource capacities of the target servers in the set of target servers; and partitions the target mapping space among the target servers in the set of target servers proportionally to the resource capacities of the target servers in the set of target servers.

According to some implementations, the server determines that at least one target server in the set of target servers has become unavailable. In this case, the server partitions the portion of the target mapping space associated with the at least one target server among the remaining target servers in the set of target servers proportionally to the resource capacities of the remaining target servers in the set of target servers.

According to some implementations, the mapping function is usable to map respective parameters of a respective operation to a respective mapping value in the target mapping space.

According to some implementations, the mapping function is a hash function.

According to some implementations, the operation includes a request to perform a search query, and the at least one parameter includes the search query.

According to some implementations, the operation includes a request to perform a search query, and the resource capacity of each respective target server includes the number of queries per second that the respective target server can process.

According to some implementations, the operation includes a request to write data to a target server, and the at least one parameter includes the data.

According to some implementations, the operation includes a request to write data to a target server, and the resource capacity of each respective target server includes the remaining amount of available storage space on the respective target server.

According to some implementations, a system is provided to facilitate deduplication of operations to be performed. The system includes at least one processor and memory. One or more programs are stored in the memory, and are executable by the at least one processor. The programs include executable instructions. The programs include instructions to receive an operation to be performed. The programs also include instructions to apply a mapping function to at least one parameter of the operation. The mapping function produces a mapping value in a target mapping space. The target mapping space is partitioned among target servers in a set of target servers proportionally to the resource capacities of the target servers. The programs include instructions to identify a target server in the set of target servers whose portion of the target mapping space includes the mapping value, and to issue the operation to the target server.

According to some implementations, a non-transitory computer readable storage medium stores one or more programs configured for execution by at least one processor of a computer system. The programs include instructions to receive an operation to be performed. The programs also include instructions to apply a mapping function to at least one parameter of the operation. The mapping function produces a mapping value in a target mapping space, where the target mapping space is partitioned among target servers in a set of target servers proportionally to the resource capacities of the target servers. The programs include instructions to identify a target server in the set of target servers whose portion of the target mapping space includes the mapping value, and to issue the operation to the target server.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

DETAILED DESCRIPTION

Figure 1:
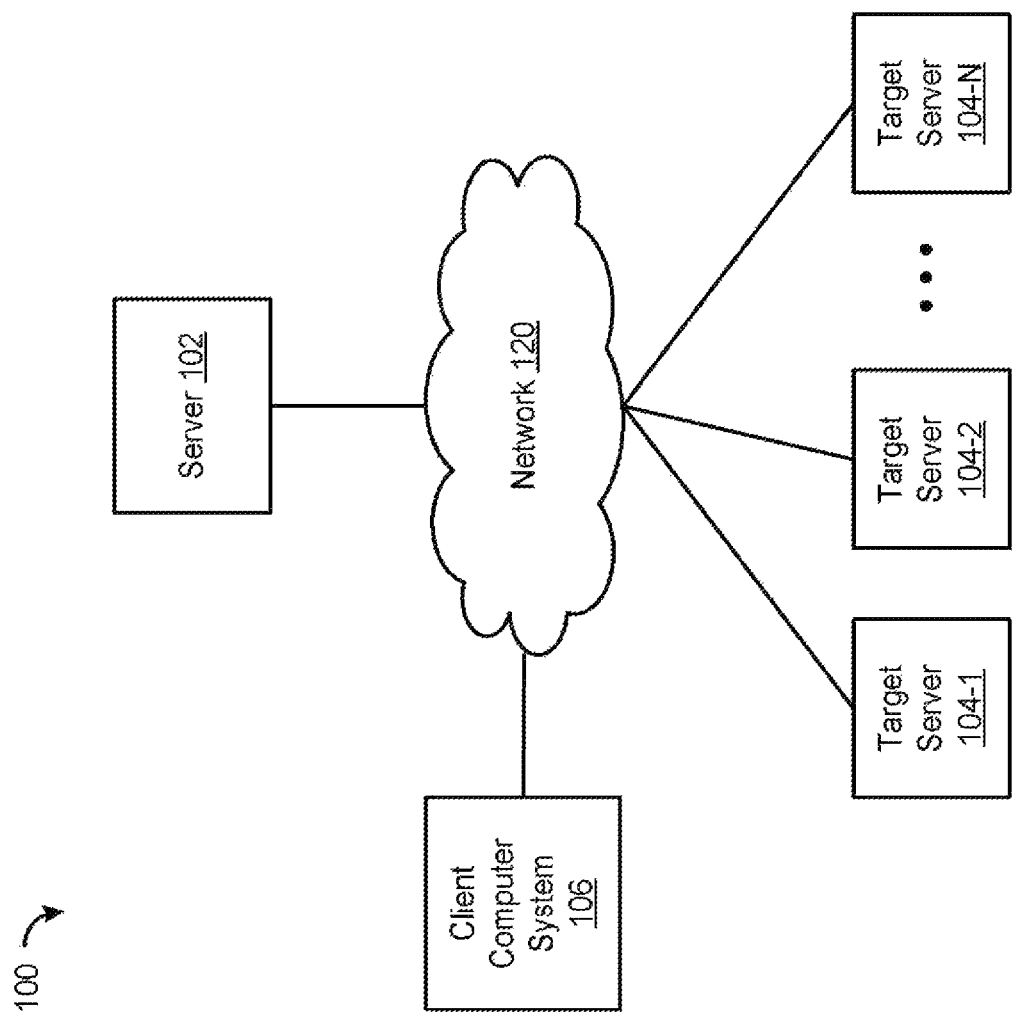
FIG. 1 is a block diagram illustrating a network system, according to some implementations.

FIG. 1 is a block diagram illustrating a network system 100, according to some implementations. The network system 100 includes a server 102, a plurality of target servers 104-1 to 104-N, and a client computer system 106 coupled to network 120. In some implementations, the target servers 104-1 to 104-N are targets of operations that the server 102 issues. For example, the server 102 may issue a read operation to one of the target servers 104-1 to 104-N to read data stored on one of the target servers 104-1 to 104-N. In another example, the server 102 may issue a write operation to one of the target servers 104-1 to 104-N to write data to one of the target servers 104-1 to 104-N. Other operations that the server 102 may issue, include, but are not limited to, an operation to delete data stored on a target server, an operation to update data stored on a target server, an operation to perform a search query, and any operations involving data. Note that the term "data" is used in this specification to include any type of data (e.g., binary, text, etc.) and also includes metadata (e.g., data about the data).

In some implementations, a respective target server is a compute node in a compute cluster of a distributed computing system. Note that a compute node includes one or more computer systems including one or more processors that provides computational resources for other computer systems. In some implementations, a respective target server is a storage node in a storage cluster of a distributed storage system. In some implementations, the respective target server is a local server (e.g., in the same data center, the same building, and/or the same geographic location, etc., as the server 102). In some implementations, the respective target server is a remote server (e.g., in a different data center, different building, and/or different geographic location, etc., as the server 102).

In some implementations, the server 102 is a compute node in a compute cluster of the distributed computing system. In some implementations, the server 102 is a storage node in a storage cluster of the distributed storage system.

The client computer system 106 includes, but is not limited to, a desktop computer system, a laptop computer system, a smart phone, a mobile phone, a tablet computer system, a server, a game console, a set top box, a television set, and any device that can transmit and/or receive data via network 120.

Network 120 may generally include any type of wired or wireless communication channel capable of coupling together computing nodes. This includes, but is not limited to, a local area network, a wide area network, or a combination of networks. In some implementations, network 120 includes the Internet.

Note that although FIG. 1 shows one instance of the server 102, multiple servers may be present in the network system 100. For example, the server 102 may include a plurality of distributed servers. Similarly, each of the target servers 104 may represent multiple target servers. For example, the target server 104-1 may include a plurality of distributed servers. Distributed servers may provide load balancing and/or may provide low-latency points of access to nearby computer systems. The distributed servers may be located within a single location (e.g., a data center, a building, etc.) or may be geographically distributed across multiple locations (e.g., data centers at various geographical locations, etc.). Also note that although the implementations described herein refer to the server 102, the implementations may be applied to multiple servers. Furthermore, note that the term "server" and "target server" are relative terms that are interchangeable. In this specification, the term "server" is used to refer to a computer system (e.g., the server 102) that issues an operation to on another computer system (e.g., the target server 104-1, the client computer system 106). Thus, in some instances, the server 102 may be the computer system that issues operations to another computer system (e.g., the target server 104-1). In other instances, the target server 104-1 (or another one of the target server 104-2 to 104-N, the client computer system 106, etc.) may be the computer system that issues operations to another computer system (e.g., the server 102, the target servers 104-2 to 104-N, etc.).

As discussed above, deduplication techniques cannot easily be applied across a distributed computing system. Typically, one compute cluster (or one storage cluster) does not know whether another computer cluster (or another storage cluster) has previously received and processed (and/or executed) the operation. To address these deficiencies, in some implementations, when the server 102 receives an operation to be performed, the server 102 applies a mapping function to at least one parameter of the operation to produce a mapping value in a target mapping space, which maps mapping values to target servers (e.g., in the distributed computing system). The at least one parameter of the operation includes, but is not limited to, a type of the operation (e.g., read, write, update, search, etc.), data (e.g., content such as audio files, video files, documents, text, images, etc.) included in the operation (e.g., the data to be written, a search query, etc.), an identifier for data associated with the operation (e.g., an object identifier, etc.), a network address (or other identifier) of the computer system from which the operation was received, and a network address (or other identifier) for the server 102. The target mapping space is partitioned between target servers proportional to resource capacities of the target servers. In some implementations, the resource capacities of a respective target server include the available or remaining resource capacities of the respective target server. The server 102 then identifies a target server using the mapping value and the target mapping space and issues the operation to the target server. When the server 102 (or another server) receives the same operation, or alternatively a request for which the at least one parameter of the operation is the same as a previously received operation (e.g., the data/content of the operation is the same), the mapping value will be the same and the same target server is identified. Thus, the same operation is issued to the same target server and deduplication techniques may be performed on (or by) the target server (the compute cluster, the storage cluster, etc.) to reduce duplication of data any or compute resources. For example, a search query that was issued previously to the same target server does not need to be performed by the target server again. Similarly, a video file that was previously stored on the target server does not need to be stored on the target server again. These embodiments are described in more detail below.

Figure 2A:
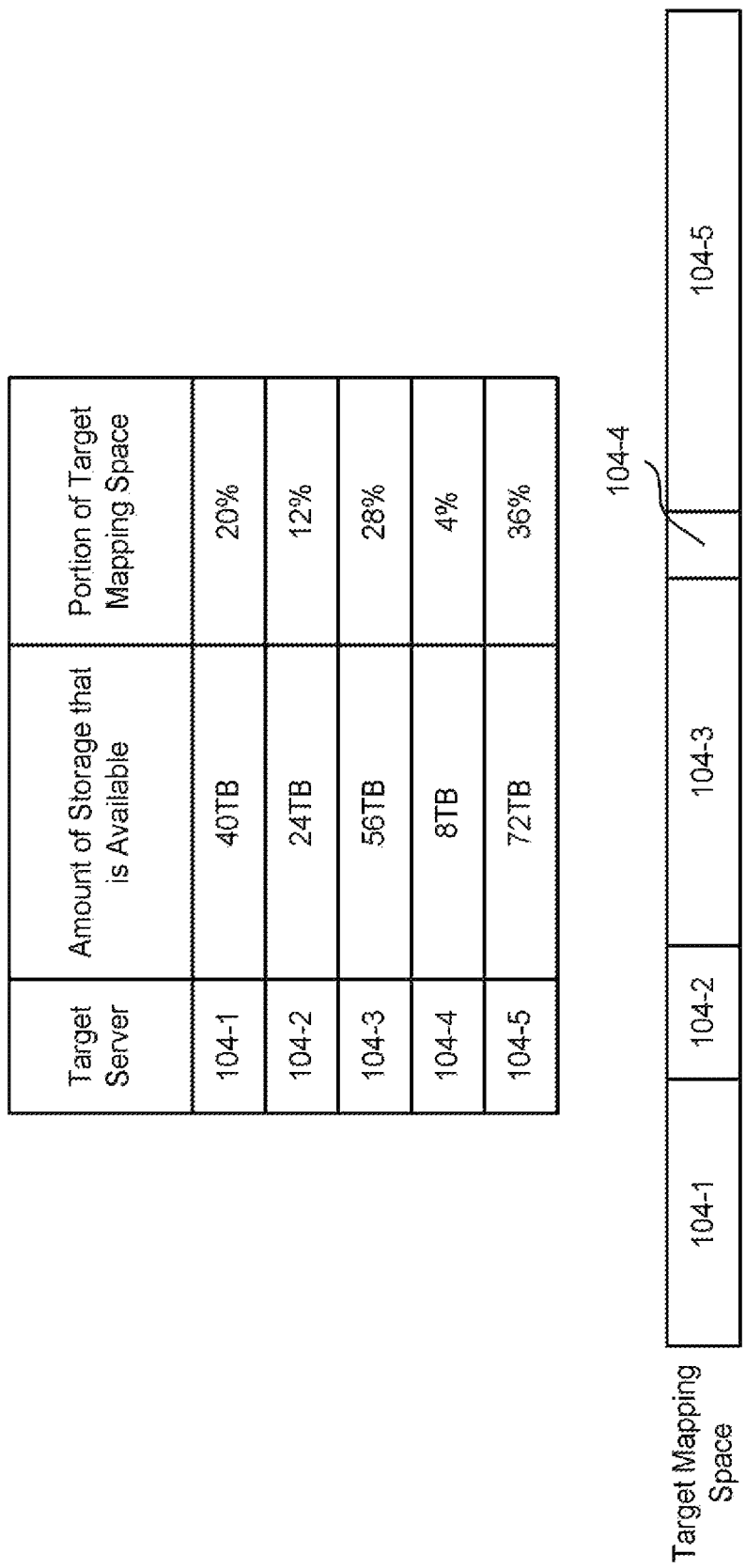
FIG. 2A is a block diagram illustrating an example target mapping space, according to some implementations.

FIG. 2A is a block diagram illustrating an example target mapping space, according to some implementations. In the example illustrated in FIG. 2A, the set of target servers includes target servers 104-1, 104-2, 104-3, 104-4, and 104-5. The resource capacities (e.g., the available or remaining resource capacities) include the amount of storage that is available for use (or that is remaining) on the target servers. The amount of storage that is available for use on each target server is as follows: 40 TB for target server 104-1, 24 TB for target server 104-2, 56 TB for target server 104-3, 8 TB for target server 104-4, and 72 TB for target server 104-5. In some implementations, the target mapping space is partitioned between the target servers proportional to resource capacities of the target servers. In the example illustrated in FIG. 2A, the total amount of storage that is available for use across the target servers 104-1 to 104-5 is 200 TB. Thus, in these implementations, the target mapping space is partitioned between the target servers as follows: 20% of the target mapping space is allocated to the target server 104-1, 12% of the target mapping space is allocated to the target server 104-2, 28% of the target mapping space is allocated to the target server 104-3, 4% of the target mapping space is allocated to the target server 104-4, and 36% of the target mapping space is allocated to the target server 104-5.

In some implementations, the target mapping space includes a range of mapping values that are produced by a mapping function. In some implementations, the mapping function is a hash function. A hash function includes any function that maps (variable or fixed length) data (e.g., a string) to a value having a fixed length. For example, the hash function may include the MD5 and the SHA-1 hash functions.

In some implementations, a respective target mapping space allocated to (or otherwise associated with) a respective target server includes a contiguous block of mapping values of the target mapping space. For example, if the target mapping space includes 100 mapping values, mapping values 1-20 of the target mapping space are allocated to the target server 104-1, mapping values 21-32 of the target mapping space are allocated to the target server 104-2, mapping values 33-60 of the target mapping space are allocated to the target server 104-3, mapping values 61-64 of the target mapping space are allocated to the target server 104-4, and mapping values 65-100 of the target mapping space are allocated to the target server 104-5. Thus, when the mapping function is applied to at least one parameter of an operation to be performed, the mapping value produced by the mapping function determines to which target server the operation is issued. For example, if the mapping function produces a mapping value of 26 when applied to the at least one parameter of the operation, the operation is issued to the target server 104-2, which has been allocated the mapping values 21-32.

Figure 2B:
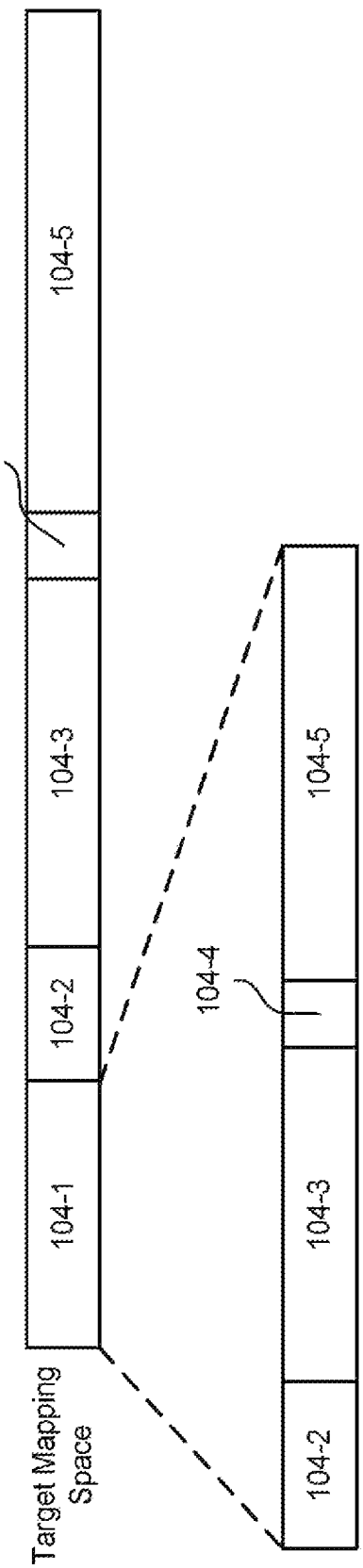
FIG. 2B is a block diagram illustrating another example target mapping space, according to some implementations.

In some implementations, when a target server in the set of target servers becomes unavailable, the portion of the target mapping space allocated to (or otherwise associated with) the target server is partitioned between the remaining target servers in the set of target servers proportional to resource capacities of the remaining target servers in the set of target servers. These implementations, are illustrated in FIG. 2B, which is based on the target mapping space illustrated in FIG. 2A. In FIG. 2B, the amount of storage that is available for use on each target server is as follows: 0 for target server 104-1, 24 TB for target server 104-2, 56 TB for target server 104-3, 8 TB for target server 104-4, and 72 TB for target server 104-5. Thus, the total amount of storage that is available for use across the target servers 104-1 to 104-5 is 150 TB. In some implementations, the target mapping space originally allocated to (or otherwise associated with) the target server 104-1 is partitioned between the target servers 104-2, 104-3, 104-4, and 104-5 as follows: 15% of the target mapping space originally allocated to the target server 104-1 is allocated to the target server 104-2, 35% of the target mapping space originally allocated to the target server 104-1 is allocated to the target server 104-3, 5% of the target mapping space originally allocated to the target server 104-1 is allocated to the target server 104-4, and 45% of the target mapping space originally allocated to the target server 104-1 is allocated to the target server 104-5. Continuing the example from above where the target mapping space includes 100 mapping values, the mapping values 1-20 of the target mapping space originally allocated to (or otherwise associated with) the target server 104-1 are re-allocated to (or otherwise re-associated with) the target servers 104-2, 104-3, 104-4, and 104-5 as follows: mapping values 1-3 of the target mapping space are allocated to the target server 104-2, mapping values 4-10 of the target mapping space are allocated to the target server 104-3, mapping value 11 of the target mapping space are allocated to the target server 104-4, and mapping values 12-20 of the target mapping space are allocated to the target server 104-5. Note that in these implementations, the original allocations of the target mapping space allocated to (or otherwise associated with) the target server 104-2, 104-3, 104-4, and 104-5 remain unchanged. Thus, an operation that was directed to one of these target servers continues to be directed to the same target server.

Note that although FIGS. 2A and 2B refer to an amount of storage that is available for use by a respective target server, any other resource capacity (or combination of resource capacities) may be used to partition the target mapping space. For example, the resource capacities for the respective target server may include, but are not limited to, an amount of CPU time that is available for use by the respective target server, an amount of memory (e.g., RAM) that is available for use by the respective target server, an amount of network resources of the respective target server (e.g., memory, processing capacity, bandwidth of a network controller for the respective target server) that is available for use by the respective target server, and network resources (e.g., bandwidth) that is available for use by the respective target server (e.g., the network bandwidth of the network links between the respective target server and other computer systems that are available for use). In some implementations, when using a combination of resource capacities to partition the target mapping space, a combining function (e.g., a weighted average, etc.) is used to produce a composite capacity. The composite capacity may then be used to partition the target mapping space (e.g., as discussed above with reference to FIGS. 2A and 2B).

Figure 3:
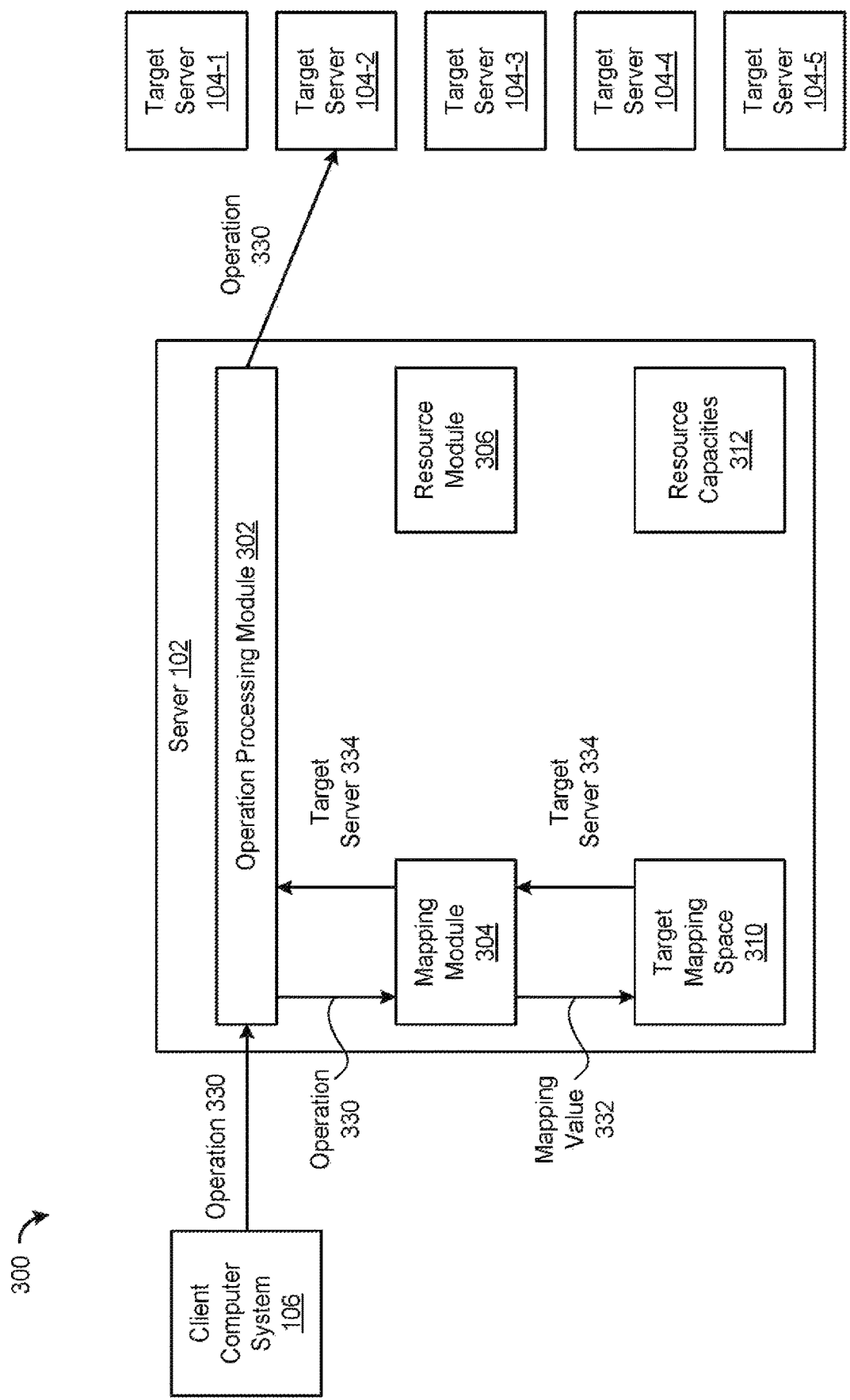
FIG. 3 is a block diagram illustrating an example process for issuing an operation, according to some implementations.

FIG. 3 is a block diagram 300 illustrating an example process for issuing an operation, according to some implementations. The client computer system 106 issues the operation 330 to the server 102. Note that although FIG. 3 illustrates that the operation 330 is received from the client computer system 106, the operation 330 may be generated by the server 102. For example, the server 102 may generate the operation 330 in response to other operations being performed on (e.g., processes being executed on) the server 102. Similarly, the operation 330 may be received from one of the target servers 104-1 to 104-N.

An operation processing module 302 of the server 102 receives the operation 330 that was issued by the client computer system 106 and provides the operation 330 to a mapping module 304. The mapping module 304 applies a mapping function to at least one parameter of the operation 330 to produce a mapping value 332 in a target mapping space 310. The mapping module 204 uses the mapping value 332 and the target mapping space 310 to identify a target server 334. In this example, the target server 334 is the target server 104-2. Thus, the operation processing module 302 issues the operation 330 to the target server 104-2.

Figure 4:
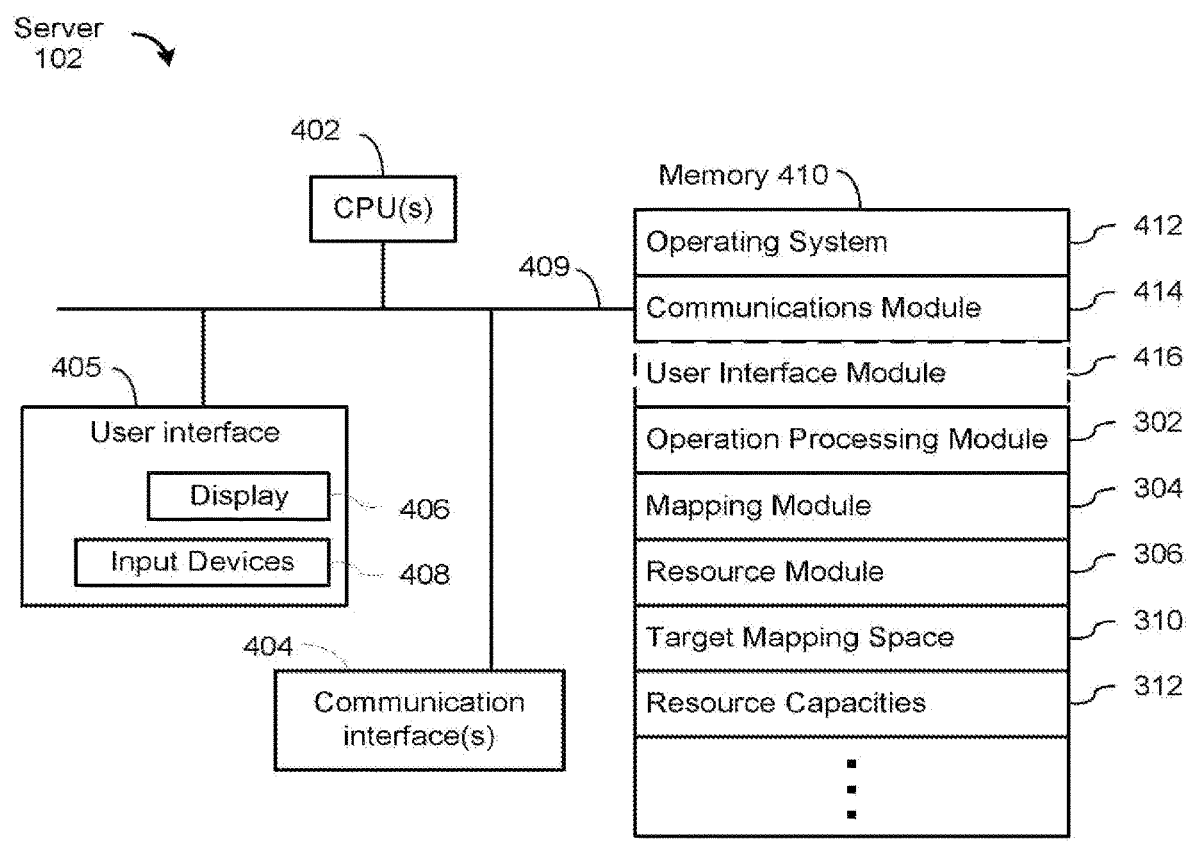
FIG. 4 is a block diagram illustrating a server, according to some implementations.

FIG. 4 is a block diagram illustrating the server 102, according to some implementations. The server 102 typically includes one or more processing units (CPU's, sometimes called processors) 402 for executing programs (e.g., programs stored in memory 410), one or more network or other communications interfaces 404, memory 410, and one or more communication buses 409 for interconnecting these components. The communication buses 409 may include circuitry (sometimes called a chipset) that interconnects and controls communications between system components. The server 102 optionally includes (but typically does not include) a user interface 405 comprising a display device 406 and input devices 408 (e.g., keyboard, mouse, touch screen, keypads, etc.). Memory 410 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 410 optionally includes one or more storage devices remotely located from the CPU(s) 402. Memory 410, or alternately the non-volatile memory device(s) within memory 410, comprises a non-transitory computer readable storage medium. In some implementations, memory 410 or the computer readable storage medium of memory 410 stores the following programs, modules and data structures, or a subset thereof:

- an operating system 412 that includes procedures for handling various basic system services and for performing hardware dependent tasks;
- a communication module 414 that is used for connecting the server 102 to other computers via the one or more communication interfaces 404 (wired or wireless) and one or more communication networks, such as the Internet, other wide area networks, local area networks, metropolitan area networks, and so on;
- an optional user interface module 416 that receives commands from the user via the input devices 408 and generates user interface objects in the display device 406;
- the operation processing module 302 that receives operations to be performed and issues the operations to target servers (e.g., the target servers 104), as described herein;
- the mapping module 304 that applies a mapping function to at least one parameter of an operation to produce a mapping value and identifies a target server based on the mapping value, and that partitions the target mapping space 310 between the target servers, as described herein;
- the resource module 306 that obtains and maintains (e.g., updates) resource capacities of the target servers;
- the target mapping space 310, as described herein; and
- resource capacities 312 of the target servers, as described herein.

In some implementations, the programs or modules identified above correspond to sets of instructions for performing a function described above. The sets of instructions can be executed by one or more processors (e.g., the CPUs 402). The above identified modules or programs (i.e., sets of instructions) need not be implemented as separate software programs, procedures or modules, and thus various subsets of these programs or modules may be combined or otherwise re-arranged in various implementations. In some implementations, memory 410 stores a subset of the modules and data structures identified above. Furthermore, memory 410 may store additional modules and data structures not described above.

Although FIG. 4 shows a "server," FIG. 4 is intended more as functional description of the various features that may be present in a set of servers than as a structural schematic of the implementations described herein. In practice, and as recognized by those of ordinary skill in the art, items shown separately could be combined and some items could be separated. For example, some items shown separately in FIG. 4 could be implemented on single servers and single items could be implemented by one or more servers. The actual number of servers used to implement a server and how features are allocated among them will vary from one implementation to another, and may depend in part on the amount of data traffic that the system must handle during peak usage periods as well as during average usage periods.

Figure 5:
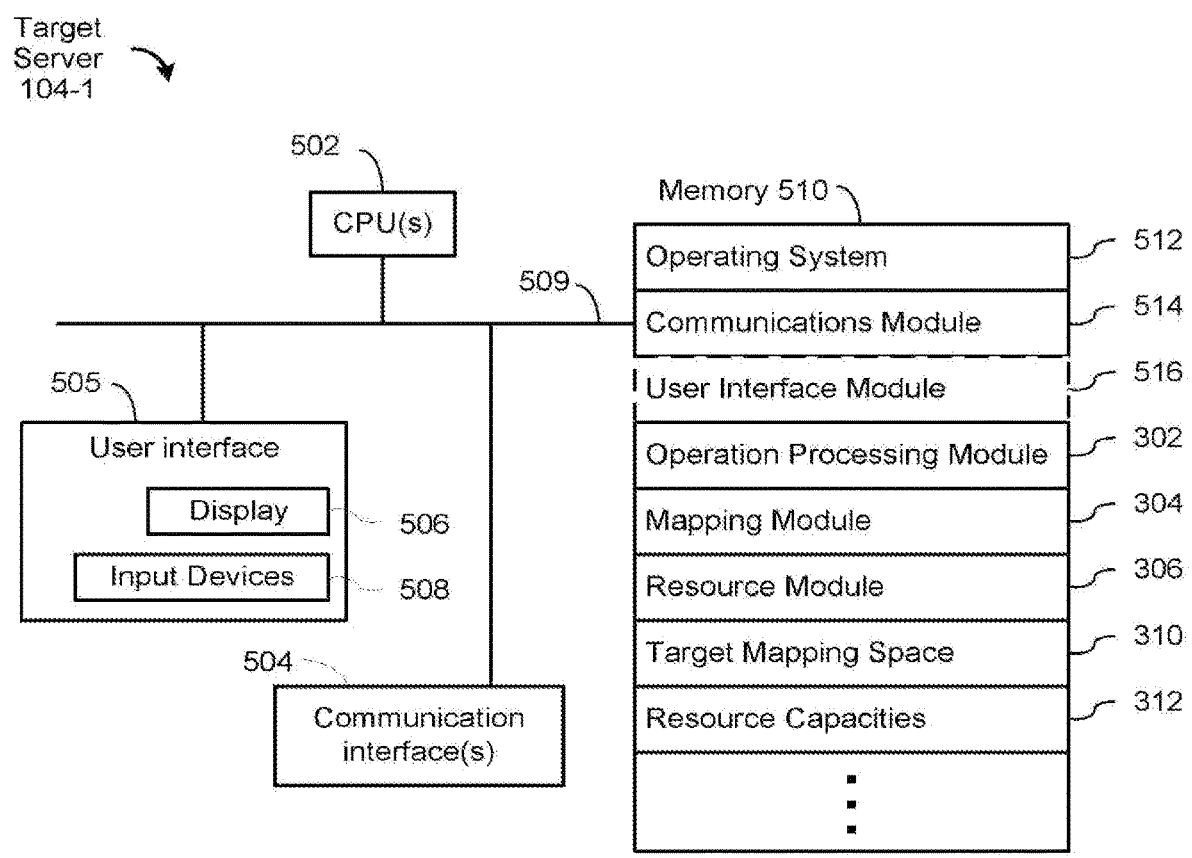
FIG. 5 is a block diagram illustrating a target server, according to some implementations.

FIG. 5 is a block diagram illustrating the target server 104-1, according to some implementations. Note that following discussion may apply to any target server (e.g., the target servers 104-2 to 104-N). The target server 104-1 typically includes one or more processing units (CPU's, sometimes called processors) 502 for executing programs (e.g., programs stored in memory 510), one or more network or other communications interfaces 504, memory 510, and one or more communication buses 509 for interconnecting these components. The communication buses 509 may include circuitry (sometimes called a chipset) that interconnects and controls communications between system components. The target server 104-1 optionally includes (but typically does not include) a user interface 505 comprising a display device 506 and input devices 508 (e.g., keyboard, mouse, touch screen, keypads, etc.). Memory 510 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 510 optionally includes one or more storage devices remotely located from the CPU(s) 502. Memory 510, or alternately the non-volatile memory device(s) within memory 510, comprises a non-transitory computer readable storage medium. In some implementations, memory 510 or the computer readable storage medium of memory 510 stores the following programs, modules and data structures, or a subset thereof:

an operating system 512 that includes procedures for handling various basic system services and for performing hardware dependent tasks;

a communication module 514 that is used for connecting the target server 104-1 to other computers via the one or more communication interfaces 504 (wired or wireless) and one or more communication networks, such as the Internet, other wide area networks, local area networks, metropolitan area networks, and so on;

an optional user interface module 516 that receives commands from the user via the input devices 508 and generates user interface objects in the display device 506;

the operation processing module 302 that receives operations to be performed and issues the operations to target servers (e.g., the target servers 104), as described herein;

the mapping module 304 that applies a mapping function to at least one parameter of an operation to produce a mapping value and identifies a target server based on the mapping value, and that partitions the target mapping space 310 between the target servers, as described herein;

the resource module 306 that obtains and maintains (e.g., updates) resource capacities of the target servers;

the target mapping space 310, as described herein; and resource capacities 312 of the target servers, as described herein.

In some implementations, the programs or modules identified above correspond to sets of instructions for performing a function described above. The sets of instructions can be executed by one or more processors (e.g., the CPUs 502). The above identified modules or programs (i.e., sets of instructions) need not be implemented as separate software programs, procedures or modules, and thus various subsets of these programs or modules may be combined or otherwise re-arranged in various implementations. In some implementations, memory 510 stores a subset of the modules and data structures identified above. Furthermore, memory 510 may store additional modules and data structures not described above.

Although FIG. 5 shows a "target," FIG. 5 is intended more as functional description of the various features that may be present in a set of target servers than as a structural schematic of the implementations described herein. In practice, and as recognized by those of ordinary skill in the art, items shown separately could be combined and some items could be separated. For example, some items shown separately in FIG. 5 could be implemented on single servers and single items could be implemented by one or more servers. The actual number of servers used to implement a target server and how features are allocated among them will vary from one implementation to another, and may depend in part on the amount of data traffic that the system must handle during peak usage periods as well as during average usage periods.

Figure 6:
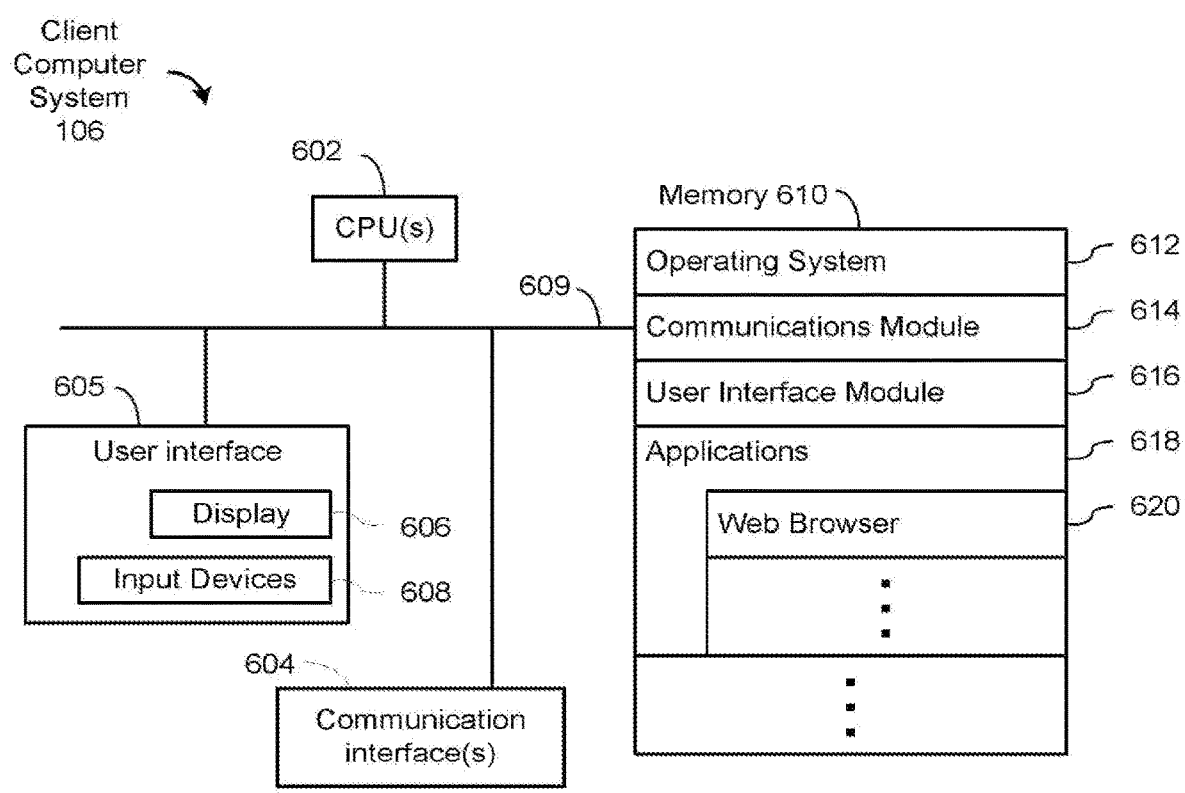
FIG. 6 is a block diagram illustrating a client computer system, according to some implementations.

FIG. 6 is a block diagram illustrating the client computer system 106, according to some implementations. The client computer system 106 typically includes one or more processing units (CPU's, sometimes called processors) 602 for executing programs (e.g., programs stored in memory 610), one or more network or other communications interfaces 604, memory 610, and one or more communication buses 609 for interconnecting these components. The communication buses 609 may include circuitry (sometimes called a chipset) that interconnects and controls communications between system components. The client computer system 106 includes a user interface 605 comprising a display device 606 and input devices 608 (e.g., keyboard, mouse, touch screen, keypads, etc.). Memory 610 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 610 optionally includes one or more storage devices remotely located from the CPU(s) 602. Memory 610, or alternately the non-volatile memory device(s) within memory 610, comprises a non-transitory computer readable storage medium. In some implementations, memory 610 or the computer readable storage medium of memory 610 stores the following programs, modules and data structures, or a subset thereof:

an operating system 612 that includes procedures for handling various basic system services and for performing hardware dependent tasks;

a communication module 614 that is used for connecting the client computer system 106 to other computers via the one or more communication interfaces 604 (wired or wireless) and one or more communication networks, such as the Internet, other wide area networks, local area networks, metropolitan area networks, and so on;

a user interface module 616 that receives commands from the user via the input devices 608 and generates user interface objects in the display device 606; and applications 618 including a web browser 620.

In some implementations, the programs or modules identified above correspond to sets of instructions for performing a function described above. The sets of instructions can be executed by one or more processors (e.g., the CPUs 602). The above identified modules or programs (i.e., sets of instructions) need not be implemented as separate software programs, procedures or modules, and thus various subsets of these programs or modules may be combined or otherwise re-arranged in various implementations. In some implementations, memory 610 stores a subset of the modules and data structures identified above. Furthermore, memory 610 may store additional modules and data structures not described above.

Although FIG. 6 shows a "client computer system," FIG. 6 is intended more as functional description of the various features which may be present in a client computer system than as a structural schematic of the implementations described herein. In practice, and as recognized by those of ordinary skill in the art, items shown separately could be combined and some items could be separated.

Issuing Operations to be Performed

Figure 7:
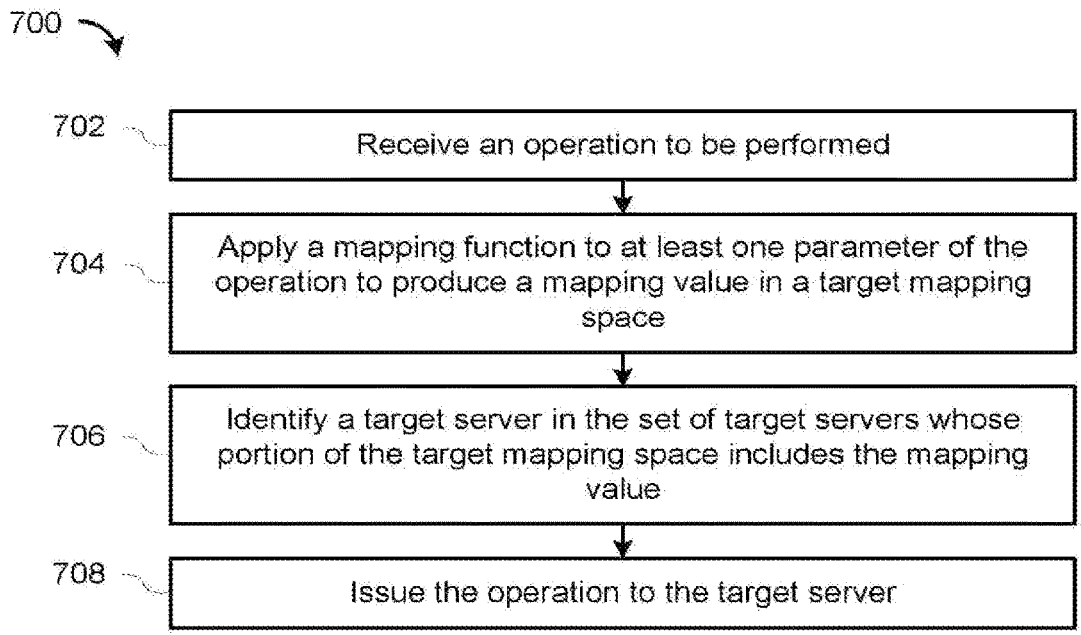
FIG. 7 is a flowchart of a method for issuing operations to be performed, according to some implementations.

FIG. 7 is a flowchart of a method 700 for issuing operations to be performed, according to some implementations. The operation processing module 302 receives (702) an operation to be performed. In some implementations, the operation processing module 302 receives the operation to be performed from the client computer system 106 (or any other computer system). In some implementations, the operation processing module 302 receives the operation to be performed from a target server (e.g., the target servers 104-1 to 104-N). In some implementations, the operation processing module 302 receives the operation to be performed from a process executing on the server 102.

In some implementations, the operation includes at least one parameter. In some implementations, the operation includes a request to perform a search query and the at least one parameter includes the search query. In some implementations, the operation includes a request to write data to a target server and the at least one parameter includes the data. Note that as discussed above, the operation may include, but are is limited to, an operation to read data stored on a target server, an operation to delete data stored on a target server, an operation to update data stored on a target server, and any operations involving data The mapping module 304 applies (704) a mapping function to at least one parameter of the operation to produce a mapping value (e.g., the mapping value 332) in a target mapping space (e.g., the target mapping space 310), where the target mapping space is partitioned between target servers in a set of target servers (e.g., the target server 104-1 to 104-N) proportional to resource capacities of the target servers in the set of target servers (e.g., as described above with reference to FIG. 2A). In some implementations, the mapping function is usable to map respective parameters of a respective operation to a respective mapping value in the target mapping space. In some implementations, the mapping function is a hash function (e.g., MD5, SHA-1, etc.). In some implementations, the operation includes a request to perform a search query and the resource capacities of a respective target server include a number of queries per second that the respective target server can process. In some implementations, the operation includes a request to write data to a target server, and the resource capacities of a respective target server include a remaining amount of available storage space on the respective target server. In some implementations, the operation includes a request to read data from a target server and the resource capacities of a respective target server include a number of queries per second that the respective target server can process. In some implementations, the operation includes a request to update data on a target server and the resource capacities of a respective target server include a number of queries per second that the respective target server can process. Operation 704 is described in more detail below with reference to FIG. 8.

The mapping module 304 identifies (706) a target server in the set of target servers whose portion of the target mapping space includes the mapping value.

The operation processing module 302 issues (708) the operation to the target server.

Figure 8:
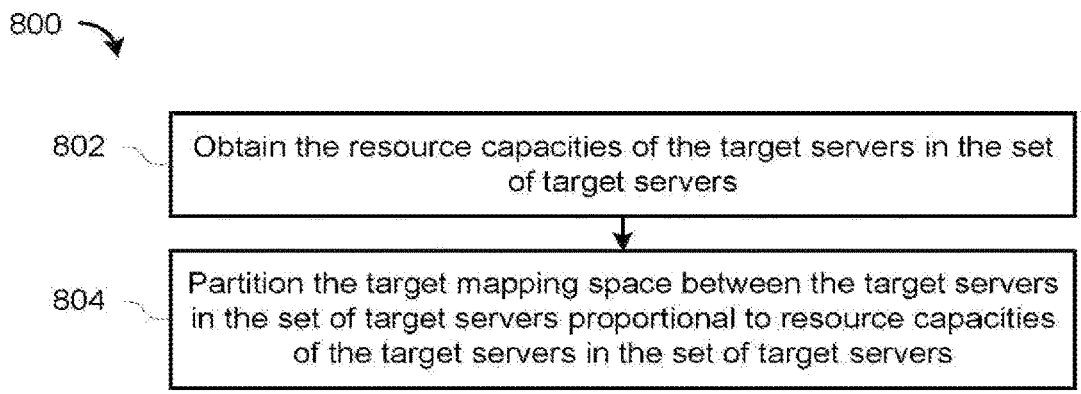
FIG. 8 is a flowchart of a method for partitioning a target mapping space, according to some implementations.

FIG. 8 is a flowchart of a method for partitioning (704) a target mapping space, according to some implementations. The resource module 306 obtains (802) the resource capacities of the target servers in the set of target servers. For example, the resource module 306 may query the target servers to obtain the resource capacities of the target servers. The mapping module 304 then partitions (804) the target mapping space between the target servers in the set of target servers proportional to resource capacities of the target servers in the set of target servers (e.g., as described above with reference to FIG. 2A).

Figure 9:
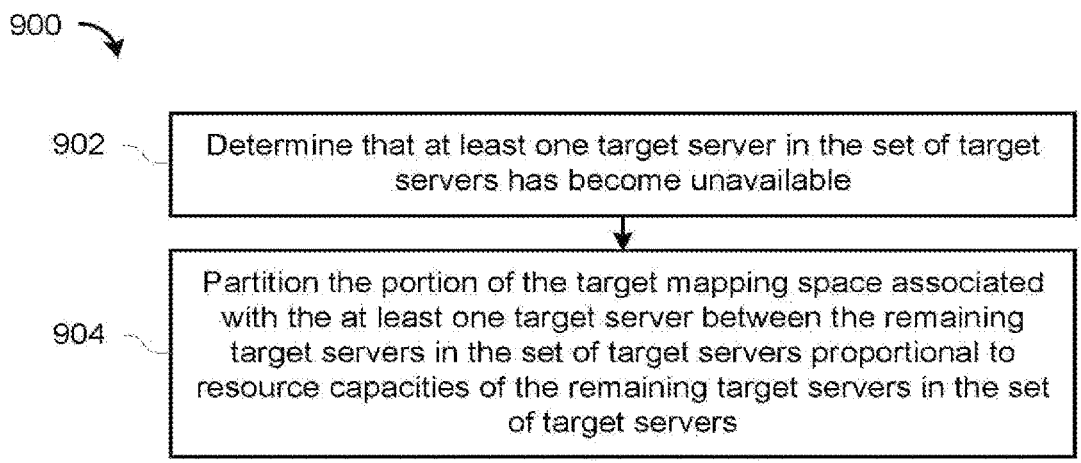
FIG. 9 is a flowchart of a method for partitioning a portion of a target mapping space associated with a particular target server, according to some implementations.

FIG. 9 is a flowchart of a method for partitioning a portion of a target mapping space associated with a particular target server, according to some implementations. The resource module 306 determines (902) that at least one target server in the set of target servers has become unavailable. For example, in response to a query from the resource module 306 to obtain the resource capacities of a particular target server, a response from the particular target server may not be received. In another example, the resource module 306 may determine that a particular target server is scheduled to be taken down at a particular time. In another example, in response to a query from the resource module 306 to obtain the resource capacities of a particular target server, a response from the particular target server may indicate that minimal resource capacities are available on the particular target server (e.g., near zero resource capacities). The mapping module 304 then partitions (904) the portion of the target mapping space associated with the at least one target server between the remaining target servers in the set of target servers proportional to resource capacities of the remaining target servers in the set of target servers (e.g., as described above with reference to FIG. 2B).

Note that although the discussion above refers to the operation processing module 302, the mapping module 304, and the resource module 306 performing the operations illustrated in FIGS. 7-9, these operations may be performed by any module (or modules) of the server 102 or any other computer system (e.g., the target servers 104-1 to 104-N).

The methods illustrated in FIGS. 7-9 may be governed by instructions that are stored in a computer readable storage medium and that are executed by at least one processor of at least one server. Each of the operations shown in FIGS. 7-9 may correspond to instructions stored in a non-transitory computer memory or computer readable storage medium. In various implementations, the non-transitory computer readable storage medium includes a magnetic or optical disk storage device, solid state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises"

and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A computer-implemented method performed on a server having at least one processor and memory, the method comprising:
   receiving an operation to be performed within a distributed computing system;
   in response to receiving the operation, determining a first mapping value for the operation based on at least a type of the operation or data included in the operation;
   identifying a target resource corresponding to the first mapping value, wherein the target resource is partitioned between a plurality of target servers in the distributed computing system based on respective resource capacities of target servers of the plurality of target servers;
   identifying, from among the plurality of target servers, a particular target server associated with the target resource;
   issuing the operation to the particular target server;
   receiving another operation including the type of the operation or the data; and
   issuing the another operation to the particular target server.

2. The method of claim 1, further comprising:
   determining that at least one target server in the plurality of target servers has become unavailable; and
   partitioning the target resource associated with the at least one target server between remaining target servers of the plurality of target servers based on resource capacities of the remaining target servers.

3. The method of claim 1, wherein the target resource allocated to the particular target server comprises two or more non-contiguous portions of a target mapping space.

4. The method of claim 3, comprising partitioning the target mapping space between the plurality of target servers based on the respective resource capacities of the target servers such that resources allocated to two or more of the target servers differ in size.

5. The method of claim 1, wherein the respective resource capacity of a target server of the plurality of target servers comprises a composite capacity based on two or more of:
   an amount of storage that is available for use at the target server;
   an amount of processor time that is available for use at the target server;
   an amount of memory that is available for use at the target server; and
   availability of network resources for use by the target server.

6. The method of claim 1, wherein determining the first mapping value comprises determining the first mapping value based on data included in the operation, and the data included in the operation comprises one of audio file data, video file data, documents, text data, or image data.

7. The computer-implemented method of claim 1, wherein the operation includes a request to write data to the target servers, and the respective resource capacities of the target servers include a remaining amount of available storage space on the plurality of target servers.

8. A system, comprising:
   at least one processor;
   memory; and
   instructions stored in the memory and executable by the at least one processor, the instructions causing the at least one processor to:
      receive an operation to be performed within a distributed computing system;
      in response to receiving the operation, determine a first mapping value for the operation based on at least a type of the operation or data included in the operation;
      identify a target resource corresponding to the first mapping value, wherein the target resource is partitioned between a plurality of target servers in the distributed computing system based on respective resource capacities of target servers in the plurality of target servers;
      identify, from among the plurality of target servers, a particular target server associated with the target resource; and
      issue the operation to the particular target server;
      receive another operation including the type of the operation or the data; and
      issue the another operation to the particular target server.

9. The system of claim 8, wherein the instructions cause the processor to:
   determine that at least one target server in the plurality of target servers has become unavailable; and
   partition the target resource associated with the at least one target server between remaining target servers of the plurality of target servers based on resource capacities of the remaining target servers.

10. The system of claim 8, wherein the target resource allocated to the particular target server comprises two or more non-contiguous portions of a target mapping space.

11. The system of claim 8, wherein the operation includes a request to perform a search query, and the respective resource capacities of the target servers include a number of queries per second that the plurality of target servers can process.

12. The system of claim 8, wherein determine the first mapping value comprises determine the first mapping value based on data included in the operation, and the data included in the operation comprises one of audio file data, video file data, documents, text data, or image data.

13. The system of claim 8, wherein the operation includes a request to write data, and the respective resource capacities of the target servers in the plurality of target servers include a remaining amount of available storage space on the target server.

14. A non-transitory computer-readable storage medium storing at least one program configured for execution by at least one processor of a computer system, the at least one program comprising instructions for:
   receiving an operation to be performed within a distributed computing system;
   in response to receiving the operation, determining a first mapping value for the operation based on at least a type of the operation or data included in the operation;
   identifying a target resource corresponding to the first mapping value, wherein the target resource is partitioned between a plurality of target servers in the distributed computing system based on respective resource capacities of target servers of the plurality of target servers;
   identifying, from among the plurality of target servers, a particular target server associated with the target resource;
   issuing the operation to the particular target server;
   receiving another operation including the type of the operation or the data; and
   issuing the another operation to the particular target server.

15. The non-transitory computer-readable storage medium of claim 14, wherein the at least one program further comprises instructions for:
   determining that at least one target server in the plurality of target servers has become unavailable; and
   partitioning the target resource associated with the at least one target server between remaining target servers of the plurality of target servers based on resource capacities of the remaining target servers.

16. The non-transitory computer-readable storage medium of claim 14, wherein the target resource allocated to the particular target server comprises two or more non-contiguous portions of a target mapping space.

17. The non-transitory computer-readable storage medium of claim 14, wherein the operation includes a request to perform a search query.

18. The non-transitory computer-readable storage medium of claim 14, wherein the operation includes a request to perform a search query, and the respective resource capacities of target server include a number of queries per second that the plurality of target servers can process.

19. The non-transitory computer-readable storage medium of claim 14, wherein determining the first mapping value comprises determining the first mapping value based on data included in the operation, and the data included in the operation comprises one of audio file data, video file data, documents, text data, or image data.

20. The non-transitory computer-readable storage medium of claim 14, wherein the operation includes a request to write data to the target server, and the respective resource capacities of the target servers include a remaining amount of available storage space on the target server.

* * * * *